United States Patent Office 3,201,447
Patented Aug. 17, 1965

3,201,447
ETHER AMINE SALTS OF DITHIOPHOSPHORIC ACID MONO AND DIESTERS
Henryk A. Cyba, Chicago, Ill., assignor to Universal Oil Products Company, Des Plaines, Ill., a corporation of Delaware
No Drawing. Filed Nov. 29, 1962, Ser. No. 241,035
10 Claims. (Cl. 260—461)

This invention relates to a novel composition of matter and to the use thereof.

The novel composition of matter of the present invention is a dithiophosphoric acid or dithiophosphate salt of a diaminodiphenyl ether and in a preferred embodiment comprises a dialkyldithiophosphate salt of a dialkyldiaminodiphenyl ether.

The novel compounds of the present invention are prepared by the reaction of dithiophosphoric acid or a dithiophosphate with a diaminodiphenyl ether in the manner to be hereinafter described in detail. In one embodiment 1 mole of the dithiophosphate is reacted with 1 mole of the diaminodiphenyl ether to form the basic salt. In a preferred embodiment 2 moles of the dithiophosphate are reacted per mole of diaminodiphenyl ether to form the neutral salt.

The dithiophosphoric acid and dithiophosphate for use in preparing the salt are illustrated by the following formula:

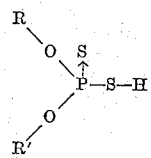

where R and R' are selected from the group consisting of hydrogen and hydrocarbon. The hydrocarbon preferably is selected from alkyl radicals containing from 1 to 20 carbon atoms each and cycloalkyl groups.

When the salt of the present invention is to be used as an additive to hydrocarbon oil, at least one of R and R' preferably is an alkyl group containing from 3 and more particularly from about 5 to about 20 carbon atoms. Illustrative dithiophosphates in this embodiment include monopropyldithiophosphate, dipropyldithiophosphate, monobutyldithiophosphate, dibutyldithiophosphate, monoamyldithiophosphate, diamyldithiophosphate, monohexyldithiophosphate, dihexyldithiophosphate, monoheptyldithiophosphate, diheptyldithiophosphate, monooctyldithiophosphate, dioctyldithiophosphate, mnnononyldithiophosphate, dinonyldithiophosphate, monodecyldithiophosphate, didecyldithiophosphate, monoundecyldithiophosphate, diundecyldithiophosphate, monododecyldithiophosphate, didodecyldithiophosphate, monotridecyldithiophosphate, ditridecyldithiophosphate, monotetradecyldithiophosphate, ditetradecyldithiophosphate, monopentadecyldithiophosphate, dipentadecyldithiophosphate, monohexadecyldithiophosphate, dihexadecyldithiophosphate, monoheptadecyldithiophosphate, diheptadecyldithiophosphate, monooctadecyldithiophosphate, dioctadecyldithiophosphate, monononadecyldithiophosphate, dinonadecyldithiophosphate, monoeicosyldithiophosphate, dieicosyldithiophosphate, etc.

In general, the alkyl group or groups will be of secondary configuration as illustrated by compounds as monoisopropyldithiophosphate, diisopropyldithiophosphate, monosec-butyldithiophosphate, disec-butyldithiophosphate and similarly substituted dithiophosphates in which the secondary alkyl group contains from 5 to about 20 carbon atoms each. In still another embodiment mixtures of monoalkyldithiophosphate and dialkyldithiophosphate are available commercially and, as another advantage to the present invention, may be used in preparing the salt without separation of the individual components. Conveniently, these alkyl groups are introduced through the use of fatty alcohols and thus the alkyl groups may be selected from capryl, lauryl, myristyl, palmityl, stearyl, cetyl, etc. It is understood that the alkyl groups may be straight or branched chain, that the alkyl groups may be primary, secondary or tertiary substituents, and that R and R' may comprise the same or different alkyl groups. The preferred cycloalkyl group comprises cyclohexyl, although it may comprise cyclopentyl, cycloheptyl, cyclooctyl, etc.

When the salt of the present invention is used as an insecticide, pesticide, fungicide, herbicide, rodenticide, etc., R and R' in the above formula are hydrogen or an alkyl group of 1 to 2 carbon atoms. Illustrative compounds in this embodiment include dithiophosphoric acid, monomethyldithiophosphate, dimethyldithiophosphate, monoethyldithiophosphate and diethyldithiophosphate.

As hereinbefore set forth, dithiophosphoric acid or the dithiophosphate is reacted with a diaminodiphenyl ether to form the salt. In a preferred embodiment, the diaminodiphenyl ether is a 2,4'-diaminodiphenyl ether and preferably 2,4'-dialkyldiaminodiphenyl ether, as illustrated by the following formula:

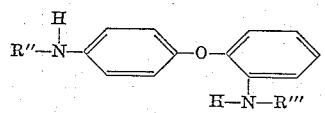

where R" and R''' are selected from the group consisting of hydrogen, alkyl and cycloalkyl groups. The alkyl groups preferably contain from 1 and more particularly from 3 and still more particularly from about 5 to about 20 carbon atoms each. Here again, when the salt is to be used as an additive to hydrocarbon oil, at least one of R" and R''' preferably comprises a hydrocarbon group of from 3 and more particularly from about 5 to about 20 carbon atoms each. Illustrative compounds in this embodiment include 2,4'-dipropyldiaminodiphenyl ether, 2,4'-dibutyldiaminodiphenyl ether, 2,4'-diamyldiaminodiphenyl ether, 2,4'-dihexyldiaminodiphenyl ether, 2,4'-diheptyldiaminodiphenyl ether, 2,4'-dioctyldiaminodiphenyl ether, 2,4'-dinonyldiaminodiphenyl ether, 2,4'-didecyldiaminodiphenyl ether, 2,4'-diundecyldiaminodiphenyl ether, 2,4'-didodecyldiaminodiphenyl ether, 2,4'-ditridecyldiaminodiphenyl ether, 2,4'-ditetradecyldiaminodiphenyl ether, 2,4'-dipentadecyldiaminodiphenyl ether, 2,4'-dihexadecyldiaminodiphenyl ether, 2,4'-diheptadecyldiaminodiphenyl ether, 2,4'-dioctadecyldiaminodiphenyl ether, 2,4'-dinonadecyldiaminodiphenyl ether, 2,4'-dieicosyldiaminodiphenyl ether, etc. In still another embodiment the monoalkyldiaminodiphenyl ether may be employed or mixtures of the monoalkyldiaminodiphenyl ether and dialkyldiaminodiphenyl ether. When employed, the alkyl group of the monoalkyldiaminodiphenyl ether will be selected from the alkyl groups hereinbefore specifically set forth.

When R" and/or R''' in the above formula is cycloalkyl, illustrative compounds include 2-cyclohexylamino-4'-aminodiphenyl ether, 2-amino-4'-cyclohexylaminodiphenyl ether and 2,4'-dicyclohexyldiaminodiphenyl ether. While the cyclohexyl derivative is preferred, it is understood that the cyclopentyl, cycloheptyl, cyclooctyl, etc. derivatives may be employed.

When the salt of the present invention is used as an insecticide, pesticide, fungicide, herbicide, rodenticide, etc., R" and R''' in the above formula may comprise alkyl groups of from 3 to about 20 carbon atoms or they may comprise hydrogen or alkyl groups of 1 to 2 carbon atoms. Illustrative diaminodiphenyl ethers in the last-mentioned embodiments include 2,4'-diaminodiphenyl ether, 2-methylamino-4'-aminodiphenyl ether, 2-amino-4'-methylaminodiphenyl ether, 2,4'-dimethyldiaminodiphenyl ether, 2-ethylamino-4'-aminodiphenyl ether, 2-amino-4'-ethylaminodiphenyl ether and 2,4'-diethyldiaminodiphenyl ether.

In another embodiment the corresponding 4,4'-diaminodiphenyl ether, 4-alkylamino-4'-aminodiphenyl ether and 4,4'-dialkyldiaminodiphenyl ether is employed in preparing the salt and is illustrated by the following formula:

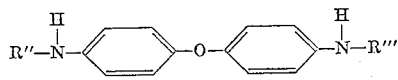

where R'' and R''' have the same connotations as hereinbefore set forth. Accordingly, the compounds in this embodiment will correspond to those hereinbefore set forth, except that both of the alkylamino substitutions are in the 4,4'-positions, and are not being repeated in the present specifications in the interest of simplicity.

In still another embodiment the diamino, dialkyldiamino or dicycloalkyldiaminodiphenyl ethers may contain one or more hydrocarbon groups attached to one or more of the phenyl or cycloalkyl rings. The hydrocarbon substituents preferably are selected from alkyl groups including methyl, ethyl, propyl, butyl, amyl, hexyl, heptyl, octyl, nonyl, decyl, undecyl, dodecyl, etc.

As hereinbefore set forth, the basic or neutral salt is prepared by the reaction of from 1 to 2 mole proportions of the dithiophosphate per 1 mole proportion of the diaminodiphenyl ether. The reaction is readily effected by commingling, preferably with intimate mixing, the desired proportions of the dithiophosphate and of the diaminodiphenyl ether. The reaction readily is effected at ambient temperature (generally 50–80° F.) and, in most cases, results in an exothermic reaction. Generally the temperature should be kept below about 200° to 250° F. and, accordingly, when desired, may be cooled in any suitable manner to prevent excessive temperature. The product generally is recovered as a viscous liquid. When desired, one or both of the reactants may be mixed with a solvent or a solvent may be added after admixing the reactants. This method is particularly desirable when the salt is to be marketed or used as a solution in the solvent. Any suitable solvent is employed and generally comprises a hydrocarbon distillate and more particularly an aromatic hydrocarbon including benzene, toluene, xylene, cumene, etc., or mixtures of these, as well as other hydrocarbon mixtures such as naphtha, kerosene, lubricating oil, etc., and, when desired, such solvents as diesters, polyesters, etc.

The hereinbefore description sets forth specific dithiophosphates and diaminodiphenyl ethers which are reacted to form the resulting salts. All salts formed by the reaction of the different dithiophosphates and diaminodiphenyl ethers specifically set forth are comprised within the present invention. However, the specific reactants selected in forming the salt will depend upon the particular use of the salt. As hereinbefore set forth, when used as an additive to an organic substrate and particularly hydrocarbon oil, R, R', R'' and R''' preferably are hydrocarbon. Also, in this particular embodiment, both the dithiophosphate and the dialkyldiaminodiphenyl ether will be selected to produce a salt which is readily soluble in the hydrocarbon oil, but yet is not diluted with excessive hydrocarbon substituents. More specifically, when the dithiophosphate contains high molecular weight alkyl or other hydrocarbon groups, the diaminodiphenyl ether preferably is devoid of hydrocarbon substituents or contains only lower alkyl groups, and vice versa.

For illustrative but not limiting purposes, preferred salts for use as additives for hydrocarbon oils include the following, which may be either the basic or neutral salts: diisopropyldithiophosphate salt of 2,4'-disec-octyldiaminodiphenyl ether, diisopropyldithiophosphate salt of 2,4'-disec-nonyldiaminodiphenyl ether, diisopropyldithiophosphate salt of 2,4'-disec-decyldiaminodiphenyl ether, diisopropyldithiophosphate salt of 2,4'-disec-undecyldiaminodiphenyl ether, diisopropyldithiophosphate salt of 2,4'-disec-dodecyldiaminodiphenyl ether, diisopropyldithiophosphate salt of 2,4'-disec-tridecyldiaminodiphenyl ether, etc., disec-butyldithiophosphate salt of 2,4'-disec-butyldiaminodiphenyl ether, disec-butyldithiophosphate salt of 2,4'-disec-amyldiaminodiphenyl ether, disec-butyldithiophosphate salt of 2,4'-disec-hexyldiaminodiphenyl ether, disec-butyldithiophosphate salt of 2,4'-disec-heptyldiaminodiphenyl ether, disec-butyldithiophosphate salt of 2,4'-disec-octyldiaminodiphenyl ether, disec-butyldithiophosphate salt of 2,4'-disec-nonyldiaminodiphenyl ether, etc., disec-amyldithiophosphate salt of 2,4'-diisopropyldiaminodiphenyl ether, disec-amyldithiophosphate salt of 2,4'-disec-butyldiaminodiphenyl ether, disec-amyldithiophosphate salt of 2,4'-disec-amyldiaminodiphenyl ether, disec-amyldithiophosphate salt of 2,4'-disec-hexyldiaminodiphenyl ether, disec-amyldithiophosphate salt of 2,4'-disec-heptyldiaminodiphenyl ether, disec-amyldithiophosphate salt of 2,4'-disec-octyldiaminodiphenyl ether, etc., disec-octyldithiophosphate salt of 2,4'-diisopropyldiaminodiphenyl ether, disec-octyldithiophosphate salt of 2,4'-disec-butyldiaminodiphenyl ether, disec-octyldithiophosphate salt of 2,4'-disec-amyldiaminodiphenyl ether, etc., O-capryl-O-lauryl-dithiophosphate salt of 2,4'-diisopropyldiaminodiphenyl ether, O-capryl-O-lauryl-dithiophosphate salt of 2,4'-disec-butyldiaminodiphenyl ether, O-capryl-O-lauryl-dithiophosphate salt of 2,4'-disec-amyldiaminodiphenyl ether, etc., O-capryl-O-palmityldithiophosphate salt of 2,4'-diisopropyldiaminodiphenyl ether, O-capryl-O-palmityl-dithiophosphate salt of 2,4'-disec-butyldiaminodiphenyl ether, O-capryl-O-lauryl-dithiophosphate salt of 2,4'-disec-amyldiaminodiphenyl ether, etc., O-capryl-O-stearyl-dithiophosphate salt of 2,4'-diisopropyldiaminodiphenyl ether, O-capryl-O-stearyl-dithiophosphate salt of 2,4'-disec-butyldiaminodiphenyl ether, O-capryl-O-stearyl-dithiophosphate salt of 2,4'-disec-amyldiaminodiphenyl ether, etc., O-lauryl-O-stearyl-dithiophosphate salt of 2,4'-diisopropyldiaminodiphenyl ether, O-lauryl-O-stearyl-dithiophosphate salt of 2,4'-disec-butyldiaminodiphenyl ether, O-lauryl-O-stearyl-dithiophosphate salt of 2,4'-disec-amyldiaminodiphenyl ether, etc., diisopropyldithiophosphate salt of 2,4'-dicyclohexyldiaminodiphenyl ether, disec-butyldithiophosphate salt of 2,4'-dicyclohexyldiaminodiphenyl ether, disec-amyldithiophosphate salt of 2,4'-dicyclohexyldiaminodiphenyl ether, etc., and similar salts of the 4,4'-diaminodiphenyl ethers.

Illustrative but not limiting examples of salts for use as insecticides, pesticides, fungicides, herbicides, rodenticides, etc., include the basic or neutral salts of the dithiophosphoric acid salt of 2,4-diaminodiphenyl ether, dithiophosphoric acid salt of 2,4'-dimethyldiaminodiphenyl ether, dithiophosphoric acid salt of 2,4'-diethyldiaminodiphenyl ether, dimethyldithiophosphate salt of 2,4'-diaminodiphenyl ether, dimethyldithiophosphate salt of 2,4'-dimethyldiaminodiphenyl ether, dimethyldithiophosphate salt of 2,4'-diethyldiaminodiphenyl ether, diethyldithiophosphate salt of 2,4'-diaminodiphenyl ether, diethyldithiophosphate salt of 2,4'-dimethyldiaminodiphenyl ether, diethyldithiophosphate salt of 2,4'-diethyldiaminodiphenyl ether, etc., and the corresponding 4,4'-diaminodiphenyl derivatives. In all these salts it is understood that the monoalkyl substituted and the mixture of the mono- and di-alkyl substituted compounds are comprised within the present invention.

When used as insecticides, pesticides, herbicides, etc., the salt may contain halogen and particularly chlorine. Other halogens include bromine, iodine and fluorine. Illustrative examples of chlorine-containing salts, which may be either the basic or neutral salts, include dithiophosphoric acid salt of 2,4'-diamino-2'-chlorodiphenyl ether, dithiophosphoric acid salt of 2,4'-diamino-4-chlorodiphenyl ether, dithiophosphoric acid salt of 2,4'-diamino-2',4-dichlorodiphenyl ether, dithiophosphoric acid salt of 2,4'-diamino-4,6-dichlorodiphenyl ether, dithiophosphoric acid salt of 2,4'-diamino-2',6'-dichlorodiphenyl ether, dithiophosphoric acid salt of 2,4'-diamino-4,6,2'-trichlorodiphenyl ether, dithiophosphoric acid salt of 2,4'-diamino-4,6,2',6'-tetrachlorodiphenyl ether, etc., similarly substituted dialkyldithiophosphates in which the alkyl groups comprise methyl and/or ethyl, and substituted 4,4'-diaminodiphenyl ethers in which the chlorine atom or atoms is or are in the positions of 2- and/or 2'-, 2,6- and/or 2',6'-.

From the hereinbefore description, it will be seen that a large number of novel salts are comprised within the present invention. It is understood that these different salts are not necessarily equivalent and that certain salts will be more effective for certain uses. In general, as hereinbefore set forth, the monoalkyl and more particularly the dialkyldiaminodiphenylphosphate salts of the monoalkyl and more particularly of the dialkyldiaminodiphenyl ethers, in which the alkyl groups each contain from about 3 and more particularly from about 5 to about 20 carbon atoms each, are preferred when the salt is to be used as an additive to hydrocarbon oil. When the salt is to be used as an insecticide, pesticide, fungicide, herbicide, rodenticide, etc., dithiophosphoric acid or the methyl or ethyl derivatives are preferred for use in preparing the salt.

As hereinbefore set forth, the salt of the present invention is particularly useful as an additive to hydrocarbon oil and more particularly as an additive to lubricating oil. In the latter oil, the compound serves a number of important functions such as oxidation inhibitor (peroxide decomposer), bearing corrosion inhibitor, ring anti-plugging additive, extreme pressure additive, anti-friction additive, anti-slipstick additive, lubricity additive, boundary lubrication additive, pour point depressant, detergent, etc.

The lubricating oil may be straight mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters or phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, diaklyl pimelates, dialkyl adipates, dialkyl glutarates, etc. Specific examples of these esters include dihexyl azelate, di-(2-ethylhexyl) azelate, di-3,5,5-trimethylhexyl glutarate, di - 3,5,5 - trimethylpentyl glutarate, di - (2-ethylhexyl) pimelate, di-(2-ethylhexyl) adipate, triamyl tricarballylate, pentaerythritol tetracaproate, dipropylene glycol dipelargonate, 1,5-pentanediol - di - (2 - ethylhexanonate), etc. The polyalkylene oxides and derivatives include polyisopropylene oxide, polyisopropylene oxide diether, polyisopropylene oxide diester, etc. The silicones include methyl silicones, methylphenyl silicones, etc., and the silicates include, for example, tetraisooctyl silicate, diphenyl di-n-dodecyl silane, octadecyl tri-n-decyl silane, polysilylmethylenes, silophenylene, various silane mixtures, silicone-ester blends, etc. The highly fluorinated hydrocarbons include fluorinated oil, perfluorohydrocarbons, etc.

Additional synthetic lubricating oils include (1) neopentyl glycol esters in which the ester group contains from 3 to 12 carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from 3 to 12 carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The present invention also is applicable to the stabilization of greases made by compositing metallic soaps with the synthetic lubricating oils described above and are referred to herein as synthetic greases. These metal base synthetic greases may be further classified as lithium base synthetic grease, sodium base synthetic grease, calcium base synthetic grease, barium base synthetic grease, strontium base synthetic grease, aluminum base synthetic grease, barium complex greases, calcium complex greases, sodium-calcium greases, lithium - 12 - hydroxy stearate greases, lithium-calcium greases, calcium-lead greases, etc. These greases are solid or semi-solid gels and, in general, are prepared by the addition to the synthetic lubricating oil of hydrocarbon-soluble metal soaps or salts of higher fatty acids as, for example, lithium stearate, calcium stearate, aluminum naphthenate, etc. The grease may contain thickening agents such as silica, carbon black, talc, organic modified bentonite, etc., polyacrylates, amides, polyamides, aluminum imides, phthalocyanines, oxanilides, complex aromatic imides and amides, hydantoin derivatives, benzidine dyes, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The novel composition also is useful in the stabilization of polyolefins and particularly polyethylene. The polyolefins preferably are of high molecular weight, usually having a molecular weight above 1000 and extending into the hundreds of thousands range. Generally these are synthetically prepared. A typical example is the widely used polyethylene plastics. Other polyolefins include polypropenes, polybutenes, and polymers of higher molecular weight olefins. These may be of the high density, medium density or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gelation upon oxidation, etc.

Other organic substances which deteriorate in storage, during treatment and/or in use, include hydrocarbons, and particularly motor fuels such as unsaturated gasoline, blends of unsaturated and saturated gasolines, etc., as well as jet fuel, diesel oil, mineral oil, industrial oil, fuel oil, residual oil, drying oil, waxes, resins, rubber, etc. These substances are adversely affected by oxygen, with the resultant formation of one or more of undesirable gum, sediment, discoloration, cracking, corrosion and/or other deleterious reactions.

When used as an additive to organic substrates, the novel salts of the present invention may be utilized in a concentration of from about 0.001% to about 25% by weight of the organic substrate, although in some cases higher or lower concentrations may be employed. The exact concentration to be used will depend upon the particular substrate to be treated. In most cases concentrations from about 0.01% to about 5% by weight generally will be employed.

It is understood that the composition of the present invention may be used along with other additives incorporated in the organic substrate. For example, one or more of an additional additive including metal deactivator, dye, viscosity index improver, pour point depressant, antifoaming additive, lubricity and extreme pressure additive, anti-scuffing additive, detergent, corrosion inhibitor, etc., may be incorporated in the substrate. When desired, the composition of the present invention may be prepared as a mixture with one or more of these other additives and marketed and/or incorporated in the substrate in this manner.

The composition of the present invention may be incorporated in the organic substrate in any suitable manner and at any suitable stage of preparation. When incorporated in a liquid substrate, the composition of matter is added thereto and intimately mixed by conventional means. When added to a solid or semi-solid substrate, the composition of the present invention preferably is added during the manufacture thereof in order to obtain intimate mixing. For example, in the manufacture of grease, the composition of the present invention preferably is added during the manufacture thereof in order to obtain intimate mixing. For example, in the manufacture of grease, the composition of the present invention may be added to one or more of the components of the grease prior to compositing and processing thereof, or it may be added to the mix at any time, preferably before final processing in order to obtain intimate mixing and dissolving thereof in the grease. In other cases, a solid substrate may be dipped, soaked, or immersed in the additive, or the latter may be sprayed, brushed or otherwise applied to the solid substrate.

As hereinbefore set forth, the novel salts of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The compounds or mixture of these may be used for the control of various larvae, mites, eggs of mites and such insects as flour beetle, Mexican bean beetle, black carpet beetle, milkweed bug, German cockroaches, southern army worms, mealy bug, sow bug, citrus red spider, greenhouse red spider, various mosquitoes, yellow fever mosquitoes, malarial mosquito, houseflies, etc.

The following examples are introduced to illustrate further the novelty and utility of the present invention but not with the intention of unduly limiting the same.

EXAMPLE I

The O-capryl-O-stearyl-dithiophosphate neutral salt of 2,4'-diisopropyldiaminodiphenyl ether was prepared as follows: 55.5 g. of (0.1 mole) of O-capryl-O-stearyl-dithiophosphate was commingled, with intimate stirring, with 14.2 g. (0.05 mole) of 2,4'-diisopropyldiaminodiphenyl ether at room temperature. An exothermic reaction resulted in the formation of the salt. The product was recovered as an amber viscous liquid.

EXAMPLE II

O-capryl-O-stearyl-dithiophospate basic salt of 2,4'-diisopropyldiaminodiphenyl ether was prepared as follows: 55.5 g. (0.1 mole) of O-capryl-O-strearyl-dithiophospate was commingled at room temperature, with intimate stirring, with 28.4 g. (0.1 mole) of 2,4'-diisopropyldiaminodiphenyl ether. An exothermic reaction resulted. The salt was recovered as an amber viscous liquid.

EXAMPLE III

The basic salt of O-capryl-O-stearyl-dithiophosphate and 4,4'-diisopropyldiaminodiphenyl ether was prepared as follows: 55.5 g. (0.1 mole) of O-capryl-O-stearyl-dithiophosphate was mixed at room temperature, with intimate stirring, with 28.4 g. (0.1 mole) of 4,4'-diisopropyldiaminodiphenyl ether. An exothermic reaction resulted in the formation of the salt which was recovered as a viscous liquid.

EXAMPLE IV

The neutral salt of O-capryl-O-stearyl-dithiophosphate and 4,4'-diisopropyldiaminodiphenyl ether was prepared by commingling, at room temperature with intimate stirring, 56.1 g. (0.1 mole) of O-capyrl-O-stearyl-dithiophosphate with14.2 g. (0.05 mole) of 4,4'-diisopropyldiaminophenyl ether. Again the reaction was exothermic. The salt was recovered as a light yellow viscous liquid.

EXAMPLE V

The neutral salt of 2,4'-disec-octyldiaminodiphenyl ether and mixed mono- and di-amyldithiophosphates is prepared by commingling 2 mole proportions of the mixed mono- and diamyldithophosphates with 1 mole proportion of 2,4'-disec-octyldiaminadiphenyl ether at room temperature with intimate mixing. An exothermic reaction occurs. The salt is recovered as a viscous liquid.

EXAMPLE VI

The neutral salt of mixed mono- and di-octyldithiophosphates and 2,4'-disec-octyldiaminodiphenyl ether is prepared by commingling 2 mole proportions of the mixed mono- and di-octyldithiophosphates with 1 mole proportion of 2,4'-disec-octyldiaminodiphenyl ether at room temperature with intimate mixing. An exothermic reaction occurs and the salt is recovered as a viscous liquid.

EXAMPLE VII

The neutral salt of dithiophospheric acid and 2,4'-dimethyldiaminodiphenyl ether is prepared by commingling 2 mole proportions of dithiophosphoric acid with 1 mole proportion of 2,4'-dimethyldiaminodiphenyl ether at room temperature with intimate stirring. An exothermic reaction occurs and the salt is recovered as a viscous liquid.

EXAMPLE VIII

The basic salt of O,O-dimethyldithiophosphate and 2,4'-diisopropyldiaminodiphenyl ether is prepared by commingling equal mole proportions of O,O-dimethyldithiophosphate with 2,4'-diisopropyldiaminophenyl ether at room temperature with intimate stirring. An exothermic reaction results and the salt is recovered as a viscous liquid.

EXAMPLE IX

The neutral salt of O,O-diethyldithiophosphate and 2,4'-dioctyldiaminodiphenyl ether is prepared by commingling 2 mole proportions of O,O-diethyldithiophosphate with 1 mole proportion of 2,4'-dioctyldiaminodiphenyl ether at room temperature with intimate stirring. Here again, an exothermic reaction occurs and the salt is recovered as a viscous liquid.

EXAMPLE X

When used as a lubricating oil additive, it is essential that the additive serves at least two important functions. One of these important functions is the prevention of corrosion and this is determined by measuring the loss in weight of the bearing. Another important function of the additive is to maintain the cleanliness of the oil during use and thereby to prevent seizure from occurring.

The dialkyldiaminodiphenyl ethers, in general, are effective additives for lubricating oils. These compounds serve to retard corrosion, as evidenced by a low loss in bearing weight. While these additives also appear to satisfactorily maintain cleanliness of the oil when operated under comparatively mild conditions, some difficulty is encountered when the engine is operated under severe conditions. The dithiophosphate salts of the dialkyldiaminodiphenyl ethers are both effective corrosion inhibitors and also maintain the cleanliness of the oil to a much higher degree when the engine is operated under the more severe condtions. This is demonstrated by the following data.

The runs reported in this example were made in a Lauson engine. However, these runs were made at the high jacket temperature of 350° F. and a low oil temperature of 180° F. The lubricating oil is a commercial highly refined paraffinic oil and the gasoline is 80/87 grade aviation gasoline.

A sample of the lubricating oil without additive, when evaluated in the above manner, resulted in a bearing weight loss of 1.6094 g., a high percent of plugging of the oil rings, an oil consumption of 28.5 ml./hr. and seizure occurred at 24 hours. Analysis of the used oil showed a neutralization number of 1.07.

Another evaluation was made in the same manner as described above, except that 0.5% by weight of 2,4'-diisopropyldiaminodiphenyl ether was incorporated in the lubricating oil. In this run the bearing weight loss was 0.0538 g., but seizure occurred after 71.5 hours. The oil consumption was 18.81 ml./hr. and the neutralization number of the used oil was 0.34. However, here again, a high percentage of plugging of the oil rings occurred.

Another run was made in the same manner described above, except that 0.5% by weight of the neutral salt of O-capryl-O-stearyl-dithiophosphate and 2,4' - diisopropyldiaminodiphenyl ether (compound of Example I) was incorporated in the lubricating oil. This run continued for 100 hours without seizure. The bearing weight loss was 0.0534 g., the oil consumption was 12.93 ml./hr. and the neutralization number of the used oil was 0.15. The percent plugging of oil rings was reduced to 10.

From a comparison of the data in the above three samples, it will be noted that the 2,4'-diisopropyldiaminodiphenyl ether effectively reduced corrosion, improved the cleanliness of the oil somewhat and extended the time to seizure from 24 hours to 71.5 hours. However, the dithiophosphate salt of the dialkyldiaminodiphenyl ether, while still effectively preventing corrosion, considerably improved the cleanliness of the oil and permitted the run to continue for 100 hours without seizure occurring. Note the considerably lower oil consumption and neutralization number of the used oil.

EXAMPLE XI

The basic salt of O-capryl-O-stearyl-dithiophosphate and 2,4'-diisopropyldiaminodiphenyl ether (compound of Example II) also was evaluated in the same manner as described in Example X. In this particular oil and under the severe conditions of operation, the basic salt served to improve operation of the engine considerably, but was not as effective as the neutral salt described in Example X. In this run the basic salt reduced the bearing weight loss from 1.6094 g. to 0.0742 g. and the oil consumption from 28.50 ml./hr. to 13.30 ml./hr. The neutralization number of the used oil was reduced from 1.07 to 0.15. However, the percent of plugging of the oil rings was increased from 10% when using the oil containing the neutral salt to 25% when using the oil containing the basic salt. Accordingly, in this particular oil and under the severe conditions, the neutral salt is preferred.

EXAMPLE XII

The compound of Example III was evaluated in the Lauson engine but, in this run, a low jacket temperature of 210° F. and a high oil temperature of 280° F. was used. The lubricating oil is the same as described in Example X and 80/87 grade aviation gasoline also was used. Pertinent data of the results of the evaluation made using 0.5% by weight of the additive of Example III and of a blank or control sample (not containing an additive) are reported in the following table.

Table 1

| Description | No Additive | 0.5% by weight of additive of Example III |
|---|---|---|
| Bearing wt. loss, g | 2.9021 | 0.1892 |
| Oil ring plugging, percent | 5.0 | 0 |
| Analysis of Used Oil: | | |
| Neutralization No | 10.78 | 1.18 |
| Saponification No. (mg. KOH/g.) | 46 | 4.18 |
| Pentane Insolubles, percent | 5.16 | 0.40 |
| Viscosity, SSU— | | |
| At 100° F | 742 | 315 |
| At 210° F | 74.7 | 53.6 |

From the data in the above table, it will be seen that the salt of the present invention was very effective in retarding corrosion and in maintaining cleanliness of the oil during use.

EXAMPLE XIII

The composition of this example is the mixed mono- and diamyldithiophosphate neutral salt of 2,4'-dicyclohexyldiaminodiphenyl ether and is prepared by commingling 2 mole proportions of the dithiophosphate with 1 mole proportion of the dicyclohexyldiaminodiphenyl ether at room temperature with intimate stirring.

The salt, prepared in the above manner, is used in a concentration of 1% by weight as an additive in dioctyl sebacate, marketed commercially under the tradename of "Plexol 201." The oil is evaluated in accordance with an Oxygen Stability Test in which a 100 cc. sample of the lubricating oil is placed in a bath maintained at 400° F. and air is blown therethrough at a rate of 5 liters of air per hour. The sample of lubricating oil is examined periodically and the time required to reach an acid number of 5 is taken as the Induction Period. In a sample of the oil without additive, the Induction Period is reached in 9 hours. However, the Induction Period of a sample of the oil containing 1% by weight of the additive of this example is increased more than four times and, in addition, sludge formation and deposition during use of the oil is considerably reduced.

EXAMPLE IV

The additive of this example is the neutral salt of mixed mono- and dioctyldithiophosphates and 4,4'-di-sec-butyldiaminodiphenyl ether. It is prepared by commingling these reactants in a proportion of 2 moles of the dithiophosphates per 1 mole proportion of the diaminodiphenyl ether. The reactants are mixed at room temperature, with intimate stirring, resulting in an exothermic reaction and the formation of the salt.

The salt, prepared in the above manner, is used in a concentration of 1% as an additive to trimethylolpropane ester synthetic lubricating oil and serves to stabilize the oil against oxidative deterioration and sludge formation.

EXAMPLE XV

The salt, prepared in the manner described in Example VII, is used as a pesticide. A pesticidal composition is prepared by dissolving 1 g. of the salt, prepared as described in Example VII, in benzene. The resultant solution is sprayed on the floor of greenhouses infested with red spiders.

I claim as my invention:
1. Dialkyldithiophosphate salt of dialkyldiaminodiphenyl ether in which the sulfur atoms are attached to the phosphorus atom.
2. Dialkyldithiophosphate salt of 2,4'-dialkyldiaminodiphenyl ether in which the alkyl groups contain from 1 to 20 carbon atoms each and in which the sulfur atoms are attached to the phosphorus atom.

3. Dialkyldithiophosphate salt of 4,4'-dialkyldiaminodiphenyl ether in which the alkyl groups contain from 1 to 20 carbon atoms each and in which the sulfur atoms are attached to the phosphorus atoms.

4. Mixed mono- and diamyldithiophosphate salts of 2,4'-disec-octyldiaminodiphenyl ether and in which the sulfur atoms are attached to the phosphorus atom.

5. Mixed mono- and dioctyldiophosphate salts of 2,4'-disec-octyldiaminodiphenyl ether and in which the sulfur atoms are attached to the phosphorus atom.

6. Dialkyldithiophosphate salt of 2,4'-diisopropyldiaminodiphenyl ether and in which the sulfur atoms are attached to the phosphorus atom.

7. O-capryl-O-stearyl-dithiophosphate salt of 2,4'-diisopropyldiaminodiphenyl ether.

8. O-capryl-O-stearyl-dithiophosphate salt of 4,4'-diisopropyldiaminodiphenyl ether.

9. Mixed mono- and dialkyldithiophosphate salts of dicyclohexyldiaminodiphenyl ether and in which the sulfur atoms are attached to the phosphorus atom.

10. Mixed mono- and diamyldithiophosphate salts of 2,4'-dicyclohexyldiaminodiphenyl ether and in which the sulfur atoms are attached to the phosporus atom.

References Cited by the Examiner

UNITED STATES PATENTS

| | | | |
|---|---|---|---|
| 1,890,256 | 12/32 | Grether | 260—571 |
| 2,290,860 | 7/42 | Burk et al. | 260—571 XR |
| 2,385,088 | 9/45 | Lecher et al. | 260—571 |
| 2,409,344 | 10/46 | Davis | 260—461 XR |
| 2,508,432 | 5/50 | Smith et al. | 260—461 XR |
| 2,508,924 | 5/50 | Mertens et al. | 260—461 XR |
| 2,906,731 | 9/59 | Hill et al. | 260—461 XR |
| 2,910,499 | 10/59 | Lanham | 260—461 |
| 2,954,394 | 9/60 | Blair et al. | 260—461 |
| 2,956,921 | 10/60 | Santmyer et al. | 260—461 XR |
| 2,973,323 | 2/61 | Millikan et al. | 252—32.7 |
| 3,002,014 | 9/61 | Dinsmore et al. | 260—461 |
| 3,041,279 | 6/62 | Calhoun et al. | 252—32.7 |
| 3,074,990 | 1/63 | Cyba | 260—461 |

CHARLES B. PARKER, *Primary Examiner.*
DANIEL E. WYMAN, *Examiner.*